Patented July 12, 1938

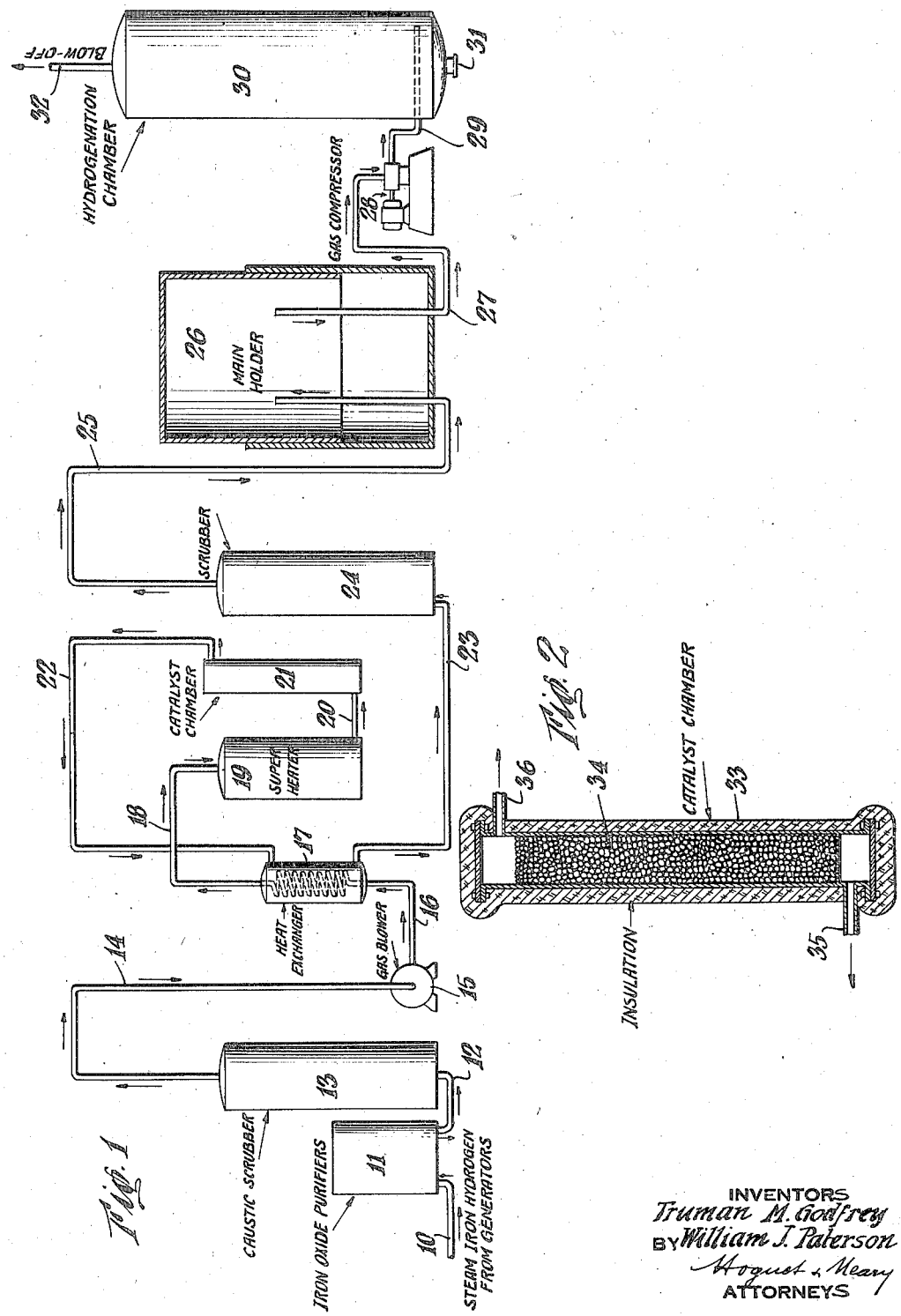

2,123,332

UNITED STATES PATENT OFFICE 2,123,332

METHOD FOR PRODUCING EDIBLE SUBSTANCES

Truman M. Godfrey, Winchester, and William J. Paterson, Chestnut Hill, Mass., assignors to Lever Brothers Company, a corporation of Maine Application May 4, 1934, Serial No. 723,838

2 Claims. (Cl. 87—12)

This invention relates to the treatment of organic compounds of the oleaginous type, and more particularly to the hydrogenation of vegetable oils containing glycerides or esters of saturated and unsaturated fatty acids.

One object of the invention is to provide a method and means for producing an improved edible product by the hydrogenation of vegetable oils.

Another object of the invention is to provide a method and means for adding hydrogen to vegetable oils in a form adapted to produce an improved hydrogenated product, particularly with respect to increased plasticity and stability, and further adapted to increase the activity and selectivity of the hydrogenating catalyst. It has been well known for many years that the glycerides and other esters of the unsaturated fatty acids such as those naturally occurring in vegetable and animal fats are capable of adding on hydrogen at the points of double linkage or unsaturation in their fatty acid component whereby they become more or less hydrogenated, depending upon the amount of hydrogen added.

The addition of hydrogen to the points of unsaturation of the fatty acids of the glyceride material is usually accomplished at elevated temperatures and pressures and is commonly brought about by contacting the unsaturated materials with hydrogen gas in the presence of a catalyst. The catalyst is usually a metal such as nickel in a finely divided state or mixture of metals or some easily reducible salt of a metal. During such hydrogenation process the unsaturated fatty acids present in the esters are changed to the corresponding saturated or at least more highly saturated fatty acid which causes the consistency of the material to progressively approach that which is desired as hydrogenation is prolonged. The most unsaturated fatty acids present in the glycerides have a tendency to become hydrogenated before those less unsaturated. For example, linolic acid present in a glyceride of cotton seed oil would absorb hydrogen more readily than oleic acid inasmuch as the former has two unsaturated bonds as against one in the latter. Thus, there is a tendency for the more unsaturated components to become hydrogenated progressively to the composition of the next least unsaturated component before other less unsaturated components take on hydrogen.

It is essential that the more unsaturated glycerides be saturated to a degree sufficient to decrease the fluidity of the oils and sufficient to improve the keeping qualities of the unsaturated components. However, the hydrogenation must be kept below a point where those components less unsaturated take on sufficient hydrogen to attain saturation. If hydrogenation is carried out to complete saturation of all the fatty acid components in the fat or oil, for example cotton seed oil is converted into a hard, brittle solid generally known as stearin. In the manufacture of hydrogenated vegetable oil compounds, however, the oil customarily is not completely hydrogenated but instead hydrogenation is carried to a point which gives a product of lard-like consistency at room temperatures.

After the oil has been hydrogenated it is customarily finished or treated to give a final desirable product for the trade by deodorizing, chilling, and texturizing processes.

Certain characteristics of the final product produced by the above-mentioned processes are also a result of other factors such as treating operations performed prior to the hydrogenation of the vegetable oil. These characteristics, however, are due to a major degree, to the hydrogenation treatment and particularly to the purity of the hydrogen gas and the sensitivity and selectivity of the catalyst used.

An important feature in the production of a desirable product is the selectivity of the catalyst used in such a hydrogenation process. An improved highly selective catalyst has been developed which particularly when used in this process will cause a selective hydrogenation of certain of the unsaturated fatty acids of the glycerides. Such catalyst in this process also will suppress the formation of solid esters of unsaturated fatty acids, particularly esters of the isooleic acids, while at the same time will avoid the production of overly hard components in the final edible product. If such a selective type of hydrogenation of the fatty material can be maintained, the final product will possess more desirable characteristics, such as better plasticity, longer keeping properties, less tendency to oxidize and become rancid and a lower solidification point. It is possible with such selective hydrogenation in carrying out this process to harden to a desired degree the more liquid components without overhardening any of the components. Previously a compromise has been necessary.

Selectivity is, in part at least, a function of the catalyst itself, but it seems rather generally true that the more selective catalysts are most easily inactivated or "poisoned" by gas purified by ordinary methods, and for this reason it is doubly true that ultra treated gas is necessary for the production of the best type of shortening. While it is not desirable to hydrogenate at too low a temperature on account of the adverse influence on selectivity, as regards the linolin constituent of the oil being hydrogenated, it is of distinct advantage to be able to operate at a moderately low temperature and at a rapid rate, thereby suppressing the formation of iso-olein and avoiding injury to the oil through long contact with the metallic nickel.

Particular difficulties have been present in operating an edible fat hydrogenating process with hydrogen made by the so-called steam-iron or contact process. As a result even though there are many advantages in the relatively cheap production of hydrogen by the contact process, it has been thought more favorable to use hydrogen from the more expensive electrolytic process. The principal reason for this is that contact hydrogen even after it has been purified by the usual processes still possesses minute traces of deleterious impurities which are not present in the electrolytic hydrogen.

Hydrogen gas, as produced by the conventional steam-iron or contact process such as is used in the Lane, Messerschmidt or Bamag plants, results from the action of steam on hot metallic iron, which has previously been formed by the reduction of iron ore with blue gas. The hydrogen formed by this method must be purified before use, since it contains traces of compounds of sulphur, arsenic, and other impurities which are detrimental to the action of the metallic catalyst ordinarily used for the hydrogenation of fats and oils.

The purification of steam-iron hydrogen is usually accomplished in three stages. First, the hot gases from the gas generators are led through cooling towers where the solid impurities and the hydrogen sulphide and carbon dioxide are partially removed by the action of fine mists or sprays of cold water. Next, the gases are forced through a series of trays containing finely divided iron oxide distributed on wood shavings. These trays containing the iron oxide and shavings are built into tanks called purifier boxes. This treatement removes the remaining traces of sulphur, cyanogen, and arsenic, so far as can be determined by ordinary analysis. Finally, the gas is passed into the base of a large chamber where it must pass through a series of caustic soda sprays or layers before it reaches the exit at the top. This caustic scrubbing removes the carbon dioxide and residual hydrogen sulphide, after which the gas is stored ready for use in the hydrogenating vessels.

It is the usual practice in the hydrogenation of fats and oils, for the steam-iron gas, after purification as described above, to be drawn into compressors and forced directly into the hydrogenation chambers without further treatment. When this type of gas is used, however, difficulty is experienced in obtaining the desired selective hydrogenation described above and also in obtaining of a product with the desired stability and plastic characteristics.

This invention overcomes the difficulties characteristic of the prior art and provides a method and means for hydrogenating the fatty vegetable material into a lard-like compound which has longer keeping properties and a substantially lower solidification point at a like iodine value than those hitherto obtained.

The invention is based on the discovery that the selectiveness of the hydrogenating operation and the effectiveness of the catalyst are functions of the properties of the hydrogen as modified by our process and that if hydrogen particularly from a contact process after having been purified in the usual manner as described above, is passed over a heated material such as finely divided nickel, prior to introduction into the hydrogenating chamber, the gas thus treated will cause the hydrogenation of fats and oils to be carried out in an improved manner to give a highly desirable product of improved characteristics, the hydrogenation is found to be carried on at a substantially greater rate than is possible with ordinary steam iron hydrogen under identical conditions. Not only is the rate of reaction increased, but it has also been found that the catalyst is more selective, lasts longer without renewal, and generally the reaction is under much better control.

These desirable results are made possible mainly by the form in which the hydrogen is introduced into the oil, that is, in an ultratreated condition resulting from a treating operation carried out just prior to the hydrogenating operation. While this treated gas may, of course, be used to some advantage with the ordinary type catalyst to give an improved product we have found by numerous tests that it is especially adaptable for use with the most highly selective types of catalyst mentioned above and disclosed in the copending application Serial No. 44,392 filed October 10, 1935. Due to the preliminary treatment of the gas the hydrogenation catalyst is found to have become more selective in hydrogenating edible fats with such treated gas and does not become poisoned. It can, therefore, be used continuously for long periods of time without losing its beneficial selective characteristics. Besides the non-poisoning characteristics of this gas, it possesses another highly beneficial characteristic, namely, the speed at which the gas will saturate the unsaturated fatty acids, particularly the more unsaturated fatty acids. This gas will also hydrogenate at substantially lower temperatures than those usually required with the ordinary gas. Tests have shown that the hydrogenation speed of the treated hydrogen gas of the invention is about three times greater than the hydrogenation speed of the ordinary hydrogen gas made by the ordinary steam-iron contact processes and purified in the usual manner. This high speed reacting gas obviously permits a shorter time of hydrogenation and therefore lowers operating costs. Also the low operating temperature in combination with the high speed hydrogenation characteristic of this gas tends to suppress the formation of solid unsaturated fatty acids, and prevents injury to the oil which ordinarily occurs when the oil remains in contact with the catalyst for too long a time.

For example, with the aid of this process, one is able to purify ordinary steam-iron hydrogen to such an extent as to make possible hydrogenations of cotton seed oil in one-third the time required under identical conditions using untreated steam-iron gas. There is presented below a table showing comparative results.

I

*Treated steam-iron hydrogen*

| Hydrogenation time in min. | Run 1, iodine value | Run 2, iodine value | Run 3, iodine value |
|---|---|---|---|
| 0 | 109 | 109 | 109 |
| 5 | 98 | 98 | 100 |
| 10 | 85 | 86 | 88 |
| 15 | 73 | 73 | 76 |
| 20 | 63 | 62 | 65 |
| Total decrease | 46 | 47 | 44 |

Average decrease—45.6 iodine values.
Hydrogenation time—20 min.

II

*Ordinary steam-iron hydrogen*

| Hydrogenation time in min. | Run 1, iodine value | Run 2, iodine value | Run 3, iodine value |
|---|---|---|---|
| 0 | 109 | 109 | 109 |
| 10 | 101 | 100 | 102 |
| 20 | 93 | 90 | 94 |
| 30 | 79 | 73 | 78 |
| 50 | 72 | 66 | 72 |
| 60 | 65 | 61 | 67 |
| Total decrease | 44 | 48 | 42 |

Average decrease—44.6 iodine values.
Hydrogenation time—60 min.

Since the decrease in iodine value of the oil is a direct measure of the amount of hydrogen absorbed in each case, it is observed that the oil which was treated with our purified hydrogen absorbed in twenty minutes slightly more gas than did the oil treated with ordinary hydrogen in sixty minutes. In other words, the hydrogenation rate with the use of our treated gas was over three times as fast as the rate with untreated gas.

These results which were obtained in hydrogenating several batches of cottonseed oil, under identical conditions as to amounts of nickel catalyst used, temperature of operation, and gas pressure, show clearly the advantage to be gained in treating steam-iron hydrogen for the hydrogenation of fats and oils.

More specifically, steam-iron hydrogen, after the usual purification by passing through wet precipitated iron oxide, and through a solution of caustic soda, may be activated by passing it at substantially low pressures (less than one atmosphere, for example) over a heated specially prepared metal catalyst such as nickel, or nickel-iron, nickel chromium, nickel-aluminum mixtures. The activating mass should be maintained at a temperature between 200° C.–500° C., depending upon the nature of the metal employed. Preferably the purified steam-iron hydrogen is passed over metallic nickel, either alone or mixed with one or more of the metals mentioned above, the temperature of the mass being held near 350° C. and the gas pressure at less than one atmosphere. A very good material may be prepared by precipitating the nickel from its soluble salt solutions with caustic soda. The precipitated oxides or hydroxides are then filtered, dried, and broken up into pieces about ¼ inch square. If desired, the metal salt may be precipitated upon a suitable carrier. The granular mass is then charged into a chamber or container suitably designed, so that the flow of gas may uniformly come in contact with the material, and provided with a heating device which will maintain the specified temperatures. A single catalyst chamber may be used, or for convenience more may be provided in parallel or in series. After charging the chamber with the granular material, heat is applied and the nickel salt reduced with hydrogen to an active state.

The production of the catalytic mass is preferably effected in such a manner as to cause the material to have great surface and yet to be brittle and hard so as to prevent powdering and sintering. In this regard, a small amount of soluble aluminum salt (not over 5%) may be advantageously mixed with the metal salt before precipitation. This acts merely as a binder to improve the physical condition of the mass, as the resulting aluminum oxide is not reduced to the metal on subsequent reduction with hydrogen, it apparently does not affect the reactions involved between the nickel and the hydrogen gas.

Other methods of preparing the material may be employed. Carriers such as pumice or firebrick may be impregnated with the nitrate or nitrates of one or several of the metals mentioned above, dried, heated, and reduced with hydrogen to the metallic state.

The manner in which the material affects the gas has not been thoroughly understood. However, it is believed that the metal under the proper conditions of temperature and pressure actually absorbs certain complex carbon and/or sulphur compounds from the gas which are present in extremely minute quantities. While the presence of such inhibiting substances have now been found as possibly evidenced by the difficulties previously associated with steam-iron gas as applied to the hydrogenation of fats and oils, they have not been positively identified by analysis due to the extremely minute proportions in which they occur. For example, steam-iron gas well purified in the usual manner will not show the presence of any sulphur. Notwithstanding all previous efforts to improve steam-iron gas through careful and repeated purification, difficulties have persisted when making use of it for hydrogenation purposes. By the proper application of this invention, however, such hydrogen gas may be economically treated so that no difficulty is encountered in the hydrogenation reaction or catalyst condition and a more selective hydrogenating operation obtained.

The ultra-treated hydrogen obtained in the manner described above by passing the ordinary purified steam-iron hydrogen over a heated metallic nickel or other suitable metal, and preferably at a pressure less than one atmosphere, is ready for use in the hydrogenation of oils. The hydrogenating process is preferably carried out as subsequently described.

A batch of cotton seed oil or other suitable oil which it is desired to hydrogenate is put into a closed container or converter with the proper amount of hydrogenating catalyst, for example, .05 to .20 of one per cent, by weight of nickel catalyst to the total weight of the oil. The catalyst, which is of a highly selective hydrogenating type and which has been found to be particularly adaptable to the invention, forms the subject-matter of another application Serial Number 44,392 and assigned to the same assignee as the present application. A hydrogenating catalyst consists essentially of nickel precipitated on kieselguhr from a solution of nickel sulphate by sodium carbonate, the nickel carbonate formed being converted into metallic nickel. The ultra-treated hydrogen is introduced under pressure into the bottom of the hydrogenation converter and is caused to bubble up through the oil and catalyst. At the beginning of the operation the oil is heated to facilitate hydrogenation, but after the operation has been started sufficient heat is supplied by the exothermic reaction to allow it to proceed rapidly without additional heating. The oil is not completely hydrogenated but is only carried to a point which gives a product of lard-like consistency at room temperatures. After the desired amount of hydrogenation has been obtained, the hydrogenated oil, while still hot enough to be in liquid form, is removed and filtered. The filtered oil may then be finished by the usual processes common to the art, after which it is ready for packaging.

The invention, both as to its organization and method of operation, will be fully understood by reference to the following more specific description taken in connection with the accompanying drawing, in which Figure 1 illustrates diagrammatically the equipment used for hydrogenating vegetable oils into an improved edible product with preliminary treated hydrogen; and Figure 2 is a detailed sectional view of the catalyst chamber diagrammatically represented in Figure 1.

Referring now to the drawing, the contact gas described above is transferred from a gas holder through the pipe 10 to the purifier 11 which contains finely divided iron oxide distributed on wood shavings. The contact gas in passing over these materials is deprived of some of its impurities, principally sulphur and arsenic. The partially purified gas next flows through the pipe 12 into the bottom of the caustic scrubber 13. In passing up through the scrubber 13, the gas is washed or scrubbed by a number of caustic soda sprays which remove most of the carbon dioxide and residual hydrogen sulphide. The gas at this point corresponds somewhat to the ordinary purified contact gas and is approximately 99½% pure hydrogen, the other one-half per cent consisting of impurities, mainly CO, $CO_2$, nitrogen and sulphur compounds. The gas next passes through pipe 14 to the rotary gas blower 15, the latter serving the purpose of blowing the gas through the system. From the rotary gas blower 15 the gas is forced through pipe 16 into the heat exchanger 17, and from there the gas flows through the pipe 18 into super-heater 19 and then through pipe 20 into catalyst chamber 21. This catalyst chamber 21 will be described more in detail below in connection with Figure 2. Suffice to say at this point that the gases are heated to about 350° C. and are passed over a nickel catalyst contained in the catalyst chamber 21.

The nickel catalyst removes substantially all of the active impurities from the gas. From chamber 21 the gas passes through pipe 22 and into the body of heat exchanger 17. The heated gas passing through the body of the heat exchanger 17 heats by conduction and radiation the cooler gas which is passing up through the coil. After leaving the body of the heat exchanger 17 the gas passes through pipe 23 into the bottom of scrubber 24, wherein the gas may be washed in a manner similar to that which takes place in scrubber 13. The scubber 24 may contain water or caustic for washing the gas. From the scrubber 24 the gas passes through pipe 25 into the main gas holder 26. From this holder 26 the treated gas passes through pipe 27 into the gas compressor 28 which compresses the gas to a pressure of approximately 45 pounds per square inch. The compressed gas flows through pipe 29 into the bottom of the hydrogenation chamber 30 under a pressure of approximately 30 pounds per square inch. The chamber 30 is approximately full, for example, of refined cotton seed oil and nickel catalyst in the proportions suggested above. The gas is caused to bubble up through the oil and catalyst contained in this chamber in quantities sufficient to hydrogenate the oil in the desired time.

The hydrogenation chamber 30 is maintained at 100° C. to 180° C. by heating and cooling coils of conventional type, not shown. The pressure in the chamber during hydrogenation is maintained at about 20 pounds per square inch. The hydrogenated oil produced in the chamber 30 is allowed to cool to about 60° C. to 70° C. and is then removed from this chamber by means of a valve 31 and after removal is filtered. The filtered oil is then purified and changed into the final product of lard-like consistency by aerating and texturizing processes already referred to. The unreacted portion of the hydrogen gas passes out of the top of the hydrogenation chamber 30 through pipe 32.

Some of the details of catalyst chamber 21 of Figure 1 are shown in Figure 2. Referring now to Figure 2, the catalyst chamber 33 consists of a tube packed with the catalyst mass 34. The hydrogen gas which has already been partially purified by treatment with caustic and iron oxide as described above in connection with Figure 1, is passed through the pipe 35 into the catalyst chamber 33. The gas passes up through the nickel catalyst mass 34 where it is treated and the ultra-purified gas passes out through the pipe 36 back to a heat exchanger such as 17 shown in Figure 1.

In one example of this invention for hydrogenating cotton seed oil with treated hydrogen gas in the presence of a highly selective type of nickel catalyst, the oil which had an iodine value of 107.7 was hydrogenated to an iodine value of 60.9. The product, on filtration from the catalyst, congealed to a white semi-solid mass having a solidification point of 27.6° C., which is several degrees lower than the solidification point of the product obtained when the ordinary steam-iron gas was used for hydrogenating the same oil.

As a result of this hydrogen treating process described above, it is possible to obtain a more active gas which substantially increases the rate of hydrogenation and is in itself an evidence of a more desirable type of reaction. The ultra-treated gas makes possible and economical a more selective hydrogenation of the vegetable oils, non-poisoning effects on the highly selective catalysts and it also increases the range of hydrogenation temperatures without undue loss in the rate of reaction. With this ultra-treated gas a rapid rate of hydrogenation may be maintained at a moderately low temperature, thereby suppressing the formation of solid unsaturated fatty acids, such, for example, as iso-olein. The high speed, low temperature operation obviously effects a reduction in the manufacturing cost. The improved edible product which is produced by this novel process of hydrogenating vegetable oils with catalytic treated hydrogen has a lower solidification point than is obtainable when the prior art processes are used. The product also shows improved keeping qualities, that is, less tendency to rancidity. The highly selective type of hydrogenation made feasible by this invention, no doubt, accounts largely for the improved characteristics of the final edible product which is produced by this improved process.

It is to be understood that this invention is not limited to the specific embodiments described hereinabove but is adaptable to various changes and modifications, the scope of which is limited only by the following claims.

We claim:

1. A method of hardening vegetable oils into plastic fats with an ultra-purified steam-iron hydrogen gas, which method comprises maintaining said oils under pressure at a temperature of not over 180° C. and in contact with a metallic hydrogenating catalyst, and introducing an ultra-purified steam-iron hydrogen gas into said oil, said steam-iron hydrogen having a purity that is obtained by purification with iron oxide and a caustic solution followed by ultra-purification obtained by passing it in a heated condition under pressure over a metallic catalyst selected from a group consisting of nickel, nickel-iron, nickel-chromium, and nickel-aluminum mixtures while said catalyst is heated to a temperature of approximately 200–500° C., whereby the formation of solid unsaturated fatty compounds is suppressed, yielding a product of greater plasticity for a given degree of saturation.

2. A method of hardening vegetable oils into plastic fats with an ultra-purified steam-iron hydrogen gas, which method comprises maintaining said oils under pressure at a temperature of not over 180° C. in contact with a pure metallic selective hydrogenating catalyst, and introducing an ultra-purified steam-iron hydrogen gas into said oil, said catalyst being of a purity to cause selective hydrogenation of the more highly unsaturated fatty compounds and to be rendered less selective in its hydrogenating action by a steam-iron hydrogen gas of less purity than said ultra-refined hydrogen, said steam-iron hydrogen having a purity that is obtained by ordinary purification with iron oxide and a caustic solution followed by ultra-purification obtained by passing it in a heated condition under pressure over a metallic catalyst selected from a group consisting of nickel, nickel-iron, nickel-chromium, and nickel-aluminum mixtures while said catalyst is heated to approximately 200–500° C., whereby said catalyst is maintained active for selective hydrogenation at said temperature and the formation of solid unsaturated fatty compounds is decreased, thereby improving both the plasticity and keeping characteristics of the hydrogenated fat.

TRUMAN M. GODFREY.
WILLIAM J. PATERSON.